(12) United States Patent
Glass (10) Patent No.: US 7,823,466 B2
(45) Date of Patent: Nov. 2, 2010

(54) DEVICE AND METHOD FOR ADJUSTING, MEASURING, AND SETTING FORCE

(76) Inventor: David E. Glass, 8137 Spring Haven La., Knoxville, TN (US) 37919

( * ) Notice: Subject to any disclaimer, the term of this patent is extended or adjusted under 35 U.S.C. 154(b) by 15 days.

(21) Appl. No.: 12/231,822

(22) Filed: Sep. 5, 2008

(65) Prior Publication Data

US 2009/0056476 A1    Mar. 5, 2009

Related U.S. Application Data

(60) Provisional application No. 60/967,471, filed on Sep. 5, 2007.

(51) Int. Cl.
  *G01L 1/26* (2006.01)
(52) U.S. Cl. .................. 73/862.392; 73/826; 73/856
(58) Field of Classification Search .................. 73/856, 73/862.361–862.391, 161–162
  See application file for complete search history.

(56) References Cited

U.S. PATENT DOCUMENTS

| | | | | |
|---|---|---|---|---|
| 3,602,043 A | * | 8/1971 | Markey | .................. 73/132 |
| 3,858,173 A | * | 12/1974 | Ryan | .................. 340/440 |
| 4,815,549 A | * | 3/1989 | Gealt | .................. 177/234 |
| 4,885,862 A | * | 12/1989 | Thayer | .................. 43/6 |
| 5,112,319 A | * | 5/1992 | Lai | .................. 604/246 |
| 5,354,144 A | * | 10/1994 | Lizakowski | .................. 404/10 |
| 6,647,802 B2 | * | 11/2003 | Willson-Hackworth et al. | .................. 73/826 |
| 6,766,698 B1 | * | 7/2004 | Robinson et al. | .................. 73/856 |
| 7,216,553 B2 | * | 5/2007 | Robinson | .................. 73/862.393 |

* cited by examiner

*Primary Examiner*—Max Noori (57) ABSTRACT

A device for setting, adjusting, and measuring a force in a system, including a first portion for measuring a system force at a first end of the device and including a measurement means, a second portion for adjusting or setting the system force at a second end of the device and including an adjustment means, a housing where the first portion corresponds to the first end of the housing and the second portion corresponds to the second end of the housing, a resilient means within the measurement means for generating a resistance force, and a visual means for indicating an amount of the system force that is related to the physical position of the adjustment means and the resistance force created by the resilient means.

17 Claims, 11 Drawing Sheets

DEVICE AND METHOD FOR ADJUSTING, MEASURING, AND SETTING FORCE

CROSS-REFERENCE TO RELATED PATENT APPLICATION

This application claims the benefit, pursuant to 35 U.S.C. §119(e), of provisional U.S. Application Ser. No. 60/967,471, filed Sep. 5, 2007, entitled "Device and Method for Adjusting, Measuring, and Setting Force," by David E. Glass, the disclosure for which is hereby incorporated herein in its entirety by reference.

FIELD OF THE INVENTION

The present invention relates to a device and method for adjusting, measuring, and setting force. More specifically, the invention relates to a device and method for adjusting, measuring, and setting the tension force in a cable system comprising one or more load-bearing members.

BACKGROUND OF THE INVENTION

In applications using cables such as wire rope or wound cables under tension, there is difficulty in accurately setting and adjusting the tension to maintain a desired level, and it requires that separate components be used to achieve each of the measurement and adjustment-setting objectives.

In many applications, the measured tension and adjustment capability in a cable system are important factors for safety, sustained operation, and system balance. For example, small scale operations such as cable operated control surfaces in aircraft, mast stays for sailboats, and rigging for tents and canopies, guide wires, and man loads, for example, require accurate balance of controllable tension. In these and higher load systems such as walkway railings, highway cable guard rails, and bridge stays, there is often a failure in the means and methods used to set initial tension in a cable system, allow for easy visual inspection of the system during its use, and provide better maintenance of system tension during temperature-related cable expansion and contraction.

Under conventional approaches, a device such as a turnbuckle can be used to connect tensioned cables in a cable system, and a separate measurement device is then used for measuring the tension in the system. Adjusting, measuring, and setting the tension for a preferred tension level is a slow and inefficient process, however, due to the fact that the measurement and adjusting-setting means are not integrated. Measurement of the cable tension in the system must first be made using a separate measurement device, and then adjustment and setting to the system must be made based on the first set of measurements, through an imprecise approximation process, followed by another iteration of the measurement, adjustment, and setting stages, and so on. Thus, there is a need that exists in the art to address these deficiencies and inadequacies.

SUMMARY OF THE INVENTION

These and other aspects of the present invention will become apparent from the following description of the preferred embodiments, which are taken in conjunction with the following drawings, although variations and modifications may be affected without departing from the spirit and scope of the novel concepts of the disclosure.

In one aspect, the present invention relates to a device for setting, adjusting, and measuring a force in a system. In one embodiment, the device includes a first portion for measuring a system force at a first end of the device and including a measurement means, a second portion for adjusting or setting the system force at a second end of the device and including an adjustment means, a housing, where the first portion corresponds to the first end of the housing and the second portion corresponds to the second end of the housing, a resilient means within the measurement means, for generating a resistance force, and, a visual means for indicating an amount of the system force that is related to the physical position of the adjustment means and the resistance force created by the resilient means. The first end and the second end are opposite ends of the device.

The first portion is operatively attached to a first force-bearing member in the system, and the second portion is operatively attached to a second force-bearing member. The first force-bearing and second force bearing member each bear either a static load or a dynamic load. The first portion and the second portion each include corresponding attachment ends, each of the attachment ends being selected from the group including a hook, loop, shackle, sleeve, clevis, rod end bearing, or other attachment configurations and threaded connection, and configured for interlocking attachment to a corresponding one of the first force-bearing member and the second force-bearing member. The cross-section of the housing is either substantially square or substantially circular. In one embodiment, the first force-bearing member and the second force-bearing member are cables in a cable system having a system tension force.

In one embodiment, a moving part of the measurement means is operable for changing its physical position in relation to the housing when a force is applied to the device in the system. It includes one of the attachment ends and is operable to extend in a direction away from the center of the housing and towards the first end of the device proportionally in response to a force applied to the device in the system. The resilient means is a spring operatively associated with the first portion inside the housing, and the moving part is operatively associated with the resilient means. The visual means is a linear scale of tension units from within a desired range of tension, marked along the body of the housing, and where the moving part moves along the linear scale of tension units to provide a measurement indication of an amount of force on the device in the system. The resilient means, in one embodiment, is a compression spring and is operable for moving the moving part in proportion to a force applied to the device in the system, and the compression spring is located inside the housing. In another embodiment, the compression spring is located outside the housing. The adjustment means is rotatable in interface with threads on an opening of the second end of the housing, for changing a distance between the second end and the first end in proportion to an amount of rotational turns applied to one of the first end or the housing.

In one embodiment, the second end and the first end remain in a fixed, non-rotatable position and the housing is rotatable for changing a distance between the adjustment end and the first end in proportion to an amount of rotational turns applied to the housing. In another embodiment, the first end and the housing remain in a fixed, non-rotatable position in relation to the second end and the second end is rotatable for changing a distance between the second end and the first end in proportion to an amount of rotational turns applied to the second end.

In another aspect, the present invention relates to a device for setting, adjusting, and measuring cable tension in a system. In one embodiment, the device includes a housing having an adjustment end and a measurement end, a measuring eyebolt corresponding to the measurement end, an indicator, an indicator retainer at an end of the measuring eyebolt, a first end plug, a compression spring, a first end plug retaining device selected from a group that includes pins, screws, retaining rings and clevises, and, an adjustment eyebolt corresponding to the adjustment end, rotatable in interface with the first end plug of the adjustment end using internal threads of the end plug. In one embodiment, the cross-section of the housing is substantially square. In another embodiment, the cross-section of the housing is substantially circular.

In one embodiment, the measuring eyebolt is operatively associated with the indicator and is configured for bearing a part of the cable tension of the system and for attaching to a first cable in the system. The measuring eyebolt includes an attachment portion and a shaft portion, where the attachment portion extends outside of the housing and includes an attachment end for attaching the first cable. The shaft portion of the measuring eyebolt is located substantially inside the housing. The attachment portion and the shaft portion are operable for preventing the measuring eyebolt from entering the inside of the housing. The first end plug is fixed at the end of the housing having the measuring eyebolt and is secured to the housing by a plug retainer. The compression spring is operatively associated on one end with the first end plug and operatively associated on the opposite end with the indicator retainer. The indicator retainer is attached to the shaft portion of the measuring eyebolt, inside the housing, and the compression spring operable for applying a resistance force in a direction directly opposite to the tension force applied to the attachment portion of the measuring eyebolt.

In one embodiment, the measuring eyebolt extends linearly outside of the housing in proportion to an amount of tension force in the system, and the shaft portion includes visual markings along its length, operable for exposing more markings outside of the housing in response to an increase in tension force in the system, and operable for exposing no markings when the system bears no tension force or a minimum force preset by adjustment of the indicator retainer. The housing has a slot cut through its wall to allow a linear range of motion of the indicator relative to a minimum and maximum possible position, to indicate the system tension. The visual markings are adjacent to the slot cut into the housing to render the indicator to be visible from the outside of the housing, and the visual markings correspond to an amount of tension force in the system. A stop sleeve located within the inside diameter of the compression spring is operatively associated with the indicator retainer and a flat indicator, where the length of the stop sleeve limits a maximum compressed length of the compression spring means. The flat indicator is operatively associated with the indicator retainer, and the indicator is sized and positioned to indicate the tension force in the system by its positional alignment with the visual markings, to provide a fail-to-safe interface to the stop sleeve.

The adjustment eyebolt is operatively associated with the second end plug and includes an attachment portion extending outside of the housing in a direction directly opposite the measuring eyebolt at the opposing end of the housing, for attaching to a second cable in the system. The adjustment eyebolt is operatively associated with threads on an opening drilled at an end of the housing, for changing the distance between the adjustment eyebolt and the measurement eyebolt in proportion to rotational turns applied to one of the adjustment eyebolt or the housing. In one embodiment, a safety wire is including in an opening through the housing, for securing a backup safety wire to prevent unintended rotation of the adjustment eyebolt.

In yet another aspect, the present invention relates to a device for setting, adjusting, and measuring tension in a cable system having one or more cables. In one embodiment, the device includes a frame housing having a set of scale markings for indicating tension, an adjustment end, and a measurement end at an opposite end of the frame housing from the adjustment end. A sliding measurement bolt is operable for slipping in the longitudinal and rotational axes through an opening in the measurement end of the frame housing. An attachment portion extends outside of the frame housing and a shaft portion is disposed partially inside the frame housing. The device further includes an adjustment bolt at the adjustment end, for adjusting the tension in the cable system, including adjustment bolt threads on one end and disposed inside the frame housing and an adjustment bolt attaching means on another end extending outside of the frame housing. The adjustment bolt is rotatable in interface with threads drilled on an opening of the adjustment end of the frame housing for changing a distance between the adjustment end and the measurement end in proportion an amount of rotational turns applied to the adjustment bolt. A locking insert threaded nut or sleeve is mounted on the adjustment bolt threads, and a compression spring is located inside the frame housing, having one end nearest to the attachment portion of the sliding measurement bolt and another end at the opposite end of the sliding measurement bolt nearest the locking insert nut, operable for providing a spring force for measurement of the tension in the cable system.

In one embodiment, a stop sleeve is located within the inside diameter of the compression spring, where the length of the stop sleeve limits a maximum compressed length of the compression spring means, and a flat indicator is mounted within the sides of the frame housing and between the compression spring and the locking insert threaded sleeve, for securing an end of the compression spring, radially centering the sliding measurement bolt within the frame housing, providing a fail-to-safe interface to the stop sleeve, and visually marking a tension in relation to the scale markings on the frame housing, the compression spring, and a desired range of tension for the cable system. There is a safety wire bore through the frame housing, operable for anchoring a backup safety wire operable for preventing unintended rotation of the adjustment eyebolt. Each of the sliding measurement bolt and the adjustment bolt include one or more attachment portions on one or more respective ends for attaching to respective cables. Each of the one or more attachment portions are selected from a group including closed eyebolts, shackles, hooks, open eyebolts, loops, threaded rods, or other attachment configurations.

In one embodiment, the compression spring includes an inner compression spring having a first diameter and an outer compression spring having a second diameter greater than the diameter of the inner compression spring, where the outer compression spring surrounds and encloses the inner compression spring. A cylindrical separation sleeve is located over the outside diameter of the inner compression spring and under the inside diameter of the outer compression spring, for providing sliding separation between the inner compression spring and the outer compression spring. The spring constants of the inner compression spring and the outer compression spring are selected such that a greater spring force is generated when both springs are used than when only one spring is used.

In one embodiment, the device further includes a mode lock means operable for selectively engaging either one or both of the inner compression spring and the outer compression spring for providing a spring force, where the mode lock means is selected from the group including a step washer, locking pin, spring clip, and other mode lock means.

In yet another aspect, the present invention relates to a method for setting, adjusting, and measuring a force in a system. In one embodiment, the method includes the steps of providing a housing having a first end, center section, and second end opposite from the first end, end, providing a measurement means at the first end of the housing, operable for measuring a force in the system, providing an adjustment means at the second end of the housing, operable for adjusting or setting the force, providing a resilient means within the measurement means, for generating a resistance force, and, providing a visual means for indicating an amount of the resistance force, where the housing is cross-sectionally square or cross-sectionally cylindrical.

In one embodiment, the method further has the steps of attaching the measurement means to a first force-bearing member, attaching the adjustment means to a second force-bearing member, and applying a static load or a dynamic load to one or more of each of the first force-bearing member and the second force-bearing member. Still further, the method includes the steps of forming attachment ends on each of the measurement means and adjustment means, where each of the attachment ends selected from the group including a hook, loop, shackle, sleeve, clevis, or other attachment configurations, and threaded connection, and configuring each of the attachment ends to be operatively associated with the first force-bearing member or the second force-bearing member. The method also has the steps of configuring the measurement means to be operable for changing its physical position in relation to the housing when a force is applied in the system, and providing an attachment end and that is operable to move linearly in proportion to a force applied in the system.

In one embodiment, the method further has the steps of providing a compression spring as the resilient means, configured to be operatively associated with the moving part for moving in proportion to a force applied in the system, and engaging the moving part with the resilient means. Still further, the method includes the steps of providing a linear scale of tension units from within a desired range of tension for the visual means, marking the scale along the body of the housing, and forming the moving part to be movable along the linear scale of tension units to provide a measurement indication of the amount of tension force in the system.

Also included are the steps of configuring the adjustment means to be rotatable in interface with threads on an opening of the first end of the frame housing, for changing a distance between the first end of the housing and the second in proportion to an amount of rotational turns applied to one of the adjustment means or the housing. In one embodiment, the method has the step of fixing the adjustment means and the measurement means in a non-rotatable position in relation to the housing, and configuring the housing to be rotatable for changing a distance between the adjustment means and the measurement means in proportion to an amount of rotational turns applied to the housing. In another embodiment, the method has the step of fixing the measurement means and the housing in a non-rotatable position in relation to the adjustment means, and configuring the adjustment end to be rotatable for changing a distance between the adjustment means and the measurement means in proportion to an amount of rotational turns applied to the adjustment means.

In yet another aspect, the present invention relates to a product for setting, adjusting, and measuring a force in a system. In one embodiment, the product is formed by any of the above-mentioned embodiments of method steps for setting, adjusting, and measuring a force in a system.

In yet another aspect, the present invention relates to a method for setting, adjusting, and measuring tension in a cable system. In one embodiment, the method includes the steps of measuring an overall force of the system, generated by one or more cables having a static or dynamic load, using a first measurement means at a central location in the system, and adjusting or setting the overall force using an adjustment means at the central location, based on a measurement obtained with the measurement means, where the measurement means and the adjustment means are operatively associated with each other at the central location, and where one or more of the measurement means and the adjustment means are directly connected to a fixed locus at an end of the system.

In yet another aspect, the present invention relates to a method of setting, adjusting, and measuring cable tension in a system. In one embodiment, the method includes the steps of providing a housing having an adjustment means at a first end and a measurement means at an opposite, second end, providing a measurement eyebolt in the measurement means, providing an indicator, providing an indicator retainer at an end of the measurement eyebolt, providing a first end plug and a second end plug, or providing threads, integrally included in the housing, providing a compression spring, providing a first end plug restraining means selected from the group including pins, screws, retaining rings, and clevises, providing a second plug retaining means selected from the group including pins, screws, retaining rings, and clevises, and, providing an adjustment eyebolt in the adjustment means operable for rotatably engaging the first end plug of the adjustment means through internal threads of the second end plug or through integral and internal threads of the housing.

In one embodiment, the method further has the steps of forming the housing to have a substantially square or substantially circular cross-section and a substantially hollow inside, placing a part of the cable tension of the system on the measurement eyebolt and attaching the measurement eyebolt to a first cable of the system, and forming an attachment portion and a shaft portion integrally with the measurement eyebolt, where the attachment portion extends outside of the housing and includes an attachment means for attaching the first cable, and where the shaft portion is disposed substantially inside the housing.

In one embodiment, the method further has the steps of configuring the attachment portion and the shaft portion to prevent the attachment portion from entering the inside of the housing, and, fixing the first end plug at the end of the housing having the measurement eyebolt and securing first end plug to the housing with a plug retaining pin, set screw, or similar retaining parts.

In one embodiment, the method further includes the steps of engaging the compression spring on one end to the first end plug and engaging the compression spring on its opposite end to the indicator retainer, fixing the indicator retainer to the shaft portion of the measurement eyebolt, inside the housing, and configuring the compression spring to generate a resistance force in a direction opposite to a tension force applied to the attachment portion of the measurement eyebolt. The method further has the steps of configuring the measurement eyebolt to extend linearly outside of the housing in proportion to an amount of the tension force in the system, setting visual markings along its length of the shaft portion of the measurement eyebolt for exposing more markings outside of the housing in response to an increase in the tension force in the system and less markings in response to a decrease in the tension force in the system, and no markings when the system bears no tension force, where the visual markings correspond to the amount of tension force in the system, and forming a slot through the wall of the housing operable for allowing a linear range of motion of the indicator to move between the minimum and maximum possible positions correlated with minimum and maximum tension settings in the system tension. It also includes the step of setting the visual markings adjacent to the slot formed into the housing, for allowing visibility of the indicator from outside of the housing.

In one embodiment, the method further has the steps of disposing the second end plug at the opposite end of the housing from the first end plug and securing the second end plug to the housing with a second plug retaining pin, set screw or similar retaining part, operatively associating the adjustment eyebolt with the second end plug, configuring the adjustment eyebolt with an attachment portion extending outside of the housing for attaching the adjustment eyebolt to a second cable in the system, and, configuring the adjustment eyebolt to be rotatably engaged with threads on an opening at an end of the housing, for changing the distance between the adjustment eyebolt and the measurement eyebolt in proportion to an amount of rotational turns applied to one of the adjustment eyebolt or the housing. A safety wire opening is provided, through the frame housing, which is operable for anchoring a backup safety wire configured to prevent rotation of the adjustment eyebolt.

In yet another aspect, the present invention relates to a product for setting, adjusting, and measuring a force in a system. In one embodiment, the product is formed by any of the above-mentioned embodiments of method steps for setting, adjusting, and measuring cable tension in a system.

In yet another aspect, the present invention relates to a method for setting, adjusting, and measuring tension in a cable system having one or more cables. In one embodiment, the method has the steps of providing a frame housing having a set of scale markings for indicating tension, an adjustment end, and a measurement end at an opposite side of the frame housing from the adjustment end, providing a sliding measurement bolt configured to slip in the longitudinal and rotational axes through an opening in the measurement end of the frame housing, the sliding measurement bolt including an attachment portion extending outside of the frame housing and a shaft portion partially inside the frame housing, providing an adjustment bolt at the adjustment end, for adjusting the tension in the cable system, including a shaft portion with threads on one end disposed inside the frame housing and an attachment portion on another end extending outside of the frame housing, and configuring the adjustment bolt be rotatable in interface with threads drilled on an opening of the adjustment end of the frame housing, for changing a distance between the adjustment end and the measurement end in proportion an amount of rotational turns applied to the adjustment bolt;

A locking insert threaded nut or sleeve is mounted on threads of the shaft portion of the sliding measurement bolt. A compression spring is provided inside the frame housing, with one end of nearest to the attachment portion of the sliding measurement bolt and its other end disposed at the opposite end of the sliding measurement bolt nearest the locking insert nut, and the compression spring is configured to generate a spring force for measurement of the tension in the cable system. A stop sleeve is provided within the inside diameter of the compression spring, for limiting a maximum compressed length of the compression spring. The step sleeve is configured to prevent over-compression of the compression spring, and for preventing failure of the compression spring;

In one embodiment, the method further has the steps of providing a flat indicator mounted within the sides of the frame housing and between the compression spring and the locking insert threaded sleeve, operable for securing an end of the compression spring means, radially centering the sliding bolt within the frame housing, providing a fail-to-safe interface to the stop sleeve, and visually marking a tension in relation to the scale markings on the frame housing, the amount of compression of the compression means, and a desired range of tension for the cable system. Also, the method has the steps of providing a sliding cover over the adjustment end, operable for preventing unintended rotation of the adjustment bolt when extended over the attachment portion thereof, and providing a safety wire opening through the frame housing, operable for anchoring a backup safety wire for preventing unintended rotation of the adjustment bolt. Each of the sliding measurement bolt and the adjustment bolt are provided with one or more attachment portions on the respective ends and are each configured for attaching to a respective cable, and the method further includes the step of selecting one or more attachment portions from a group including closed eyebolts, shackles, clevises, hooks, open eyebolts, loops, threaded rods, or other attachment configurations.

In one embodiment, a cylindrically shaped inner compression spring is provided to be included in the compression spring means, which has a first diameter, and a cylindrically-shaped outer compression spring is also provided, having a second diameter greater than the diameter of the inner compression spring, the outer compression spring is configured to surround and enclose the inner compression spring. The method further includes the step of providing a cylindrical separation sleeve over the outside diameter of the inner compression spring and under the inside diameter of the outer compression spring, and configuring it to provide sliding separation between the inner compression spring and the outer compression spring.

A specific type of inner compression spring and a specific type of outer compression spring are selected based at least partially on their corresponding spring constants, such that a greater spring force is generated when both springs are used than when only one spring is used independently. A mode lock means is provided and is configured to be operable for selectively engaging either one or both of the inner compression spring and the outer compression spring to provide a spring force, where the mode lock means is selected from the group including a step washer, locking pin, spring clip, and other mode lock means.

In one embodiment, the method further includes the step of setting, measuring, or adjusting the force in a system using any one or more of the above-mentioned embodiments of method steps.

In yet another aspect, the present invention relates to the product formed by any one or more of the above-mentioned embodiments of method steps.

BRIEF DESCRIPTION OF THE DRAWINGS

The accompanying drawings show one or more embodiments of the invention and, taken together with the written description, serve to explain the principles of the invention. Wherever possible, the same reference numbers are used throughout the drawings to refer to the same or like elements of an embodiment, and wherein.

DETAILED DESCRIPTION OF THE INVENTION

The detailed description of the invention will be made with reference to embodiments of the present invention, in conjunction with the accompanying drawings of FIGS. 1-5.

In one aspect, the present invention relates to a device for adjusting, measuring, and setting force in a cable system, according to one preferred embodiment of the present invention. Now referring to FIG. 1, the device 120 is included in cable system 110. Device 120 is configured to attach to a first force-bearing member 112 and a second force-bearing member 115 in the cable system 110. Here, the first force-bearing member 112 is a cable in the cable system 110 which bears a system tension force. The second force-bearing member 115 is a mount for termination of the system 110. Each of the force-bearing members 112, 115 is shown as bearing a static load from fixed supports.

In one or more alternative embodiments, the second force-bearing member can be selected from the group of supports that includes brackets, movable control handles, support struts, immobile structures, and structural members. Also, one or more of the force-bearing members can be under a dynamic load rather than a static load. The housing may be substantially rectangular across its length, and its cross-section may be circular, rectangular, or square. The housing may be partly open on its sides or substantially enclosed, as in the form of a tubular cylinder or rectangular prism.

Figure 2A:
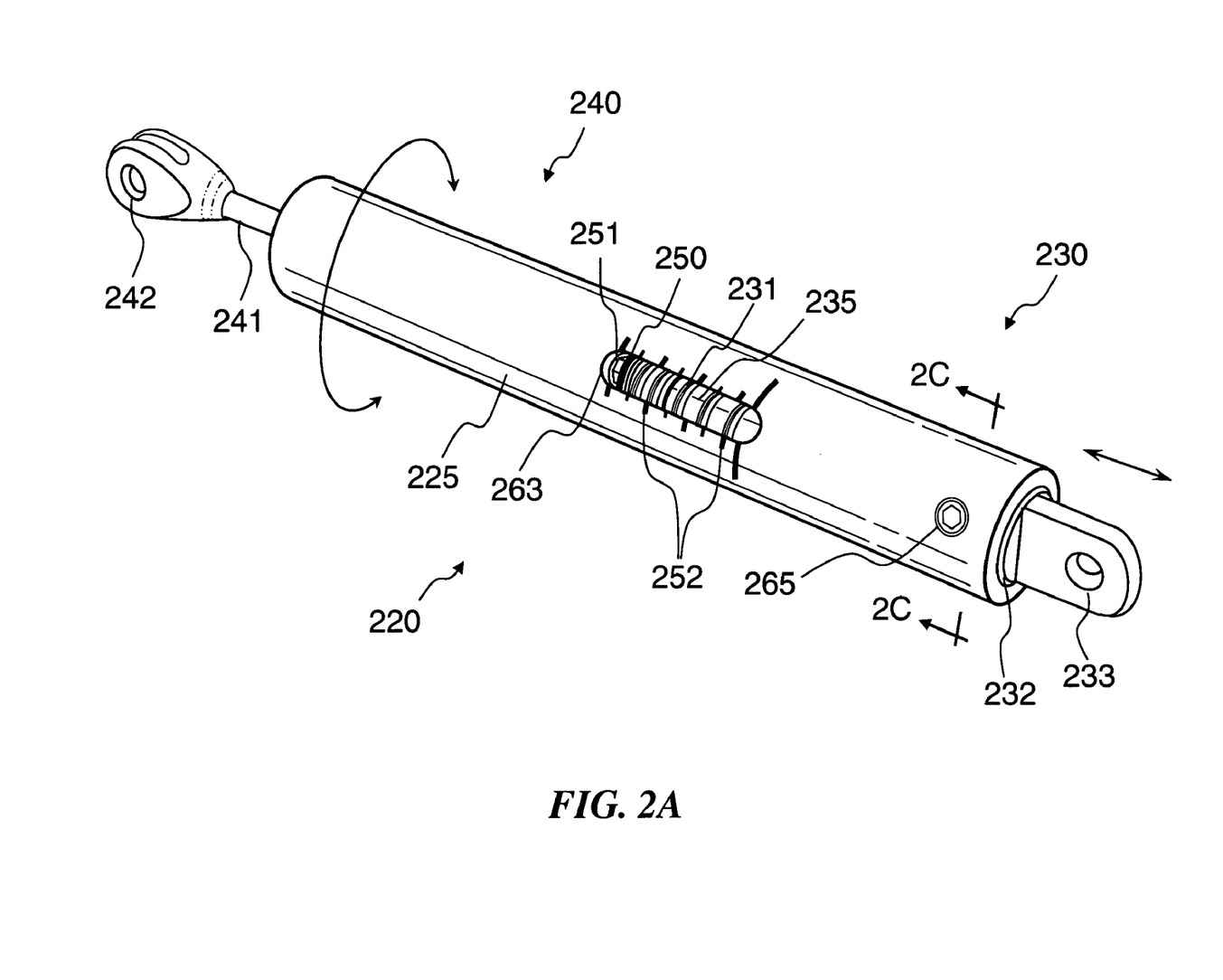
FIG. 2A is an elevational view illustrating a device according to another preferred embodiment of the present invention.

FIG. 2A shows a device according to yet another preferred embodiment of the present invention. As shown device 220 comprises three main functional sections: a housing 225; measurement section 230, which may also be referred to as a "measurement end" or "measurement means"; and, an adjustment section 240, which may also be referred to as an "adjustment end" or "adjustment means." The housing 225 is a largely closed cylinder, i.e. it is cross-sectionally circular, open at the measurement end 230 and the adjustment end 240 for insertion and locking into place the subassemblies and components that perform the measurement and adjusting functions, respectively, and which supports a resilient means 231, flat indicator 250, a safety sleeve 235, and indicator retainer 251 components.

Figure 1:
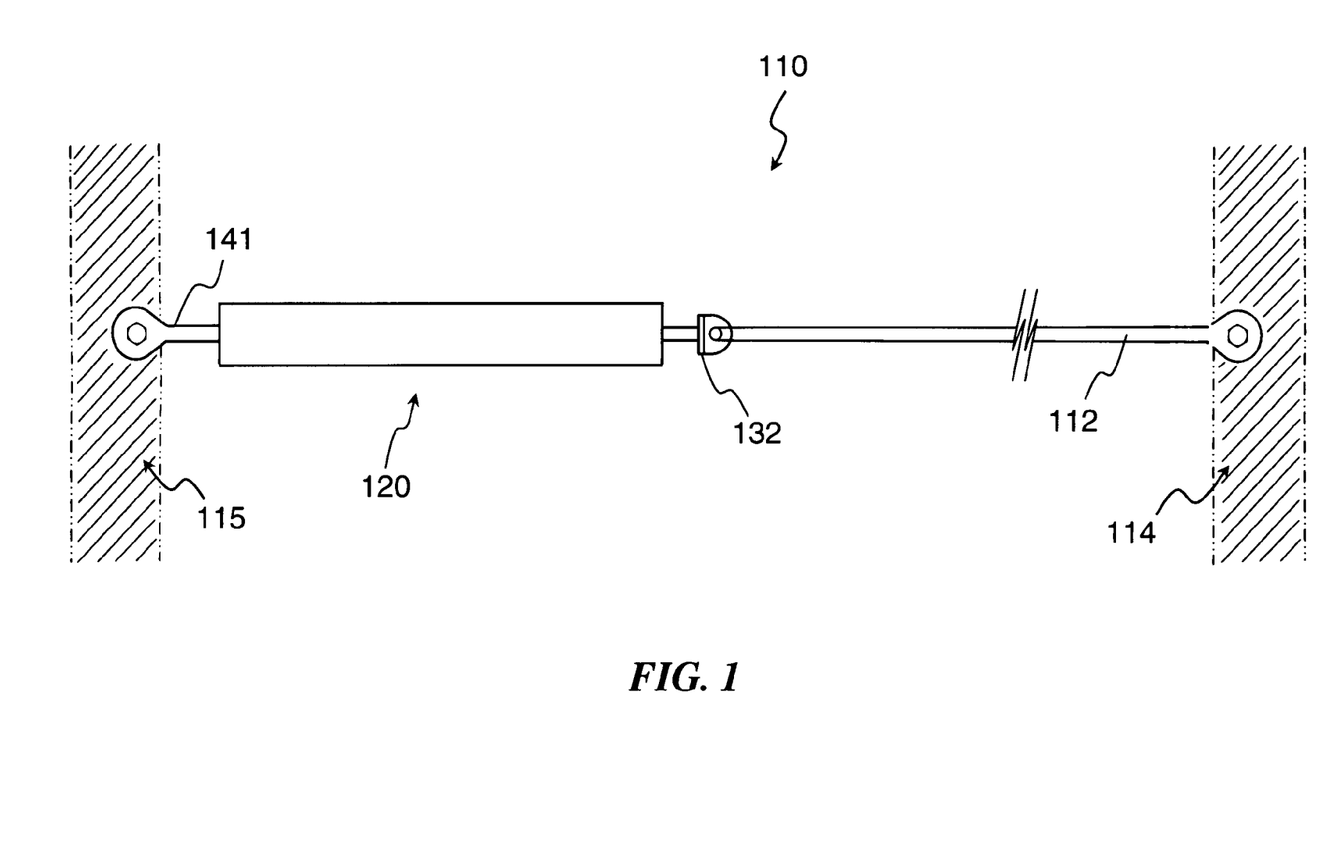
FIG. 1 shows schematically a partial view of a cable system which includes a device according to one preferred embodiment of the present invention.
Figure 2B:
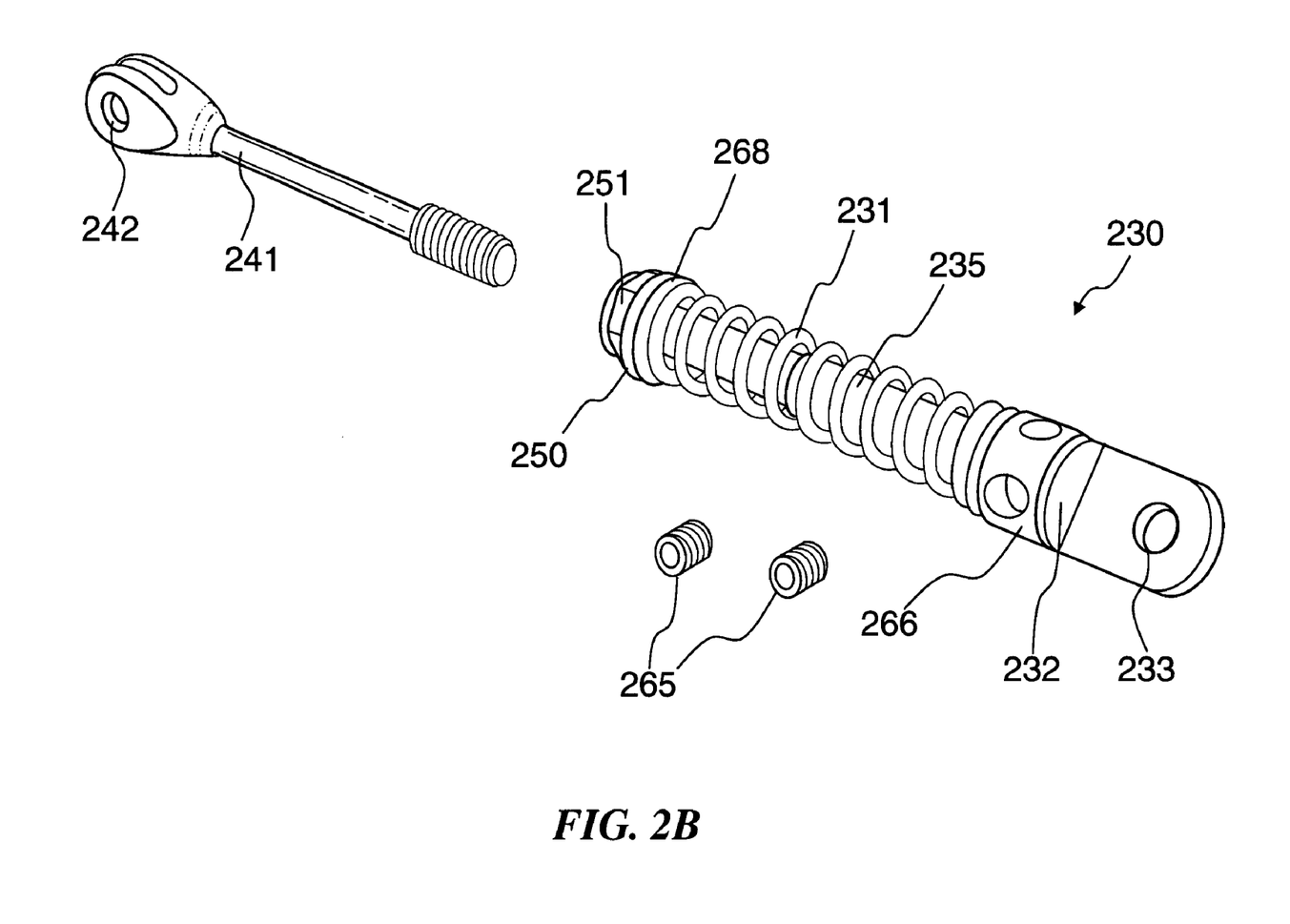
FIG. 2B shows schematically a partial view of functional subassemblies of the device shown in FIG. 2A.

As shown, device 220 comprises a flat indicator 250 showing through a slot 263 for the purpose of visual representation of tension in the system (see e.g. FIG. 1). FIG. 2B shows key functional components of the device shown in FIG. 2A, in subassembly form for measurement section 230. The measurement section 230 includes a measurement bolt 232, thrust washer 268, end plug 266, safety stop sleeve 235, compression spring 231, indicator washer 250, and nut with locking insert 251. When combined this measurement section subassembly is inserted into the housing 225 and locked into position with screws 265.

With specific regard to adjustment section 240 of the embodiment shown in FIGS. 2A and 2B, the adjustment bolt 241 is a threaded eyebolt having an integral attachment end 242. Attachment end 242 is configured to attach to one of the first or second force-bearing members in the system (see e.g. members 112, 115 in system 110 shown in FIG. 1). Although shown in FIGS. 2A-2C as an eye-type shape as part of an eyebolt, the attachment end 242 can take the form of a hook, loop, shackle, clevis, sleeve, threaded rod, rod end bearing, other means, or combination of means. The adjustment bolt 241 is configured to be rotatable in interface with threads drilled on an opening of the housing 225 at the adjustment end 240, for changing a distance between the adjustment section 240 and the measurement section 230 in proportion to an amount of rotational turns applied to the housing 225, in relation to stationary adjustment bolt 241. That is, to vary the force in the system, the measurement sliding bolt 232 and adjusting bolt 241 remain in a fixed, non-rotatable position in relation to the system 110 and the housing 225 is rotated around its longitudinal axis as indicated in FIG. 2A. Because of the interface of the threads on adjustment bolt 241 and internal threads of the housing 225, rotating the housing 225 either increases or decreases the force in the system—depending on the direction of rotation—as applied by the resilient means 231 and accordingly, the level of tension indicated by the pointer 250.

Figure 2C:
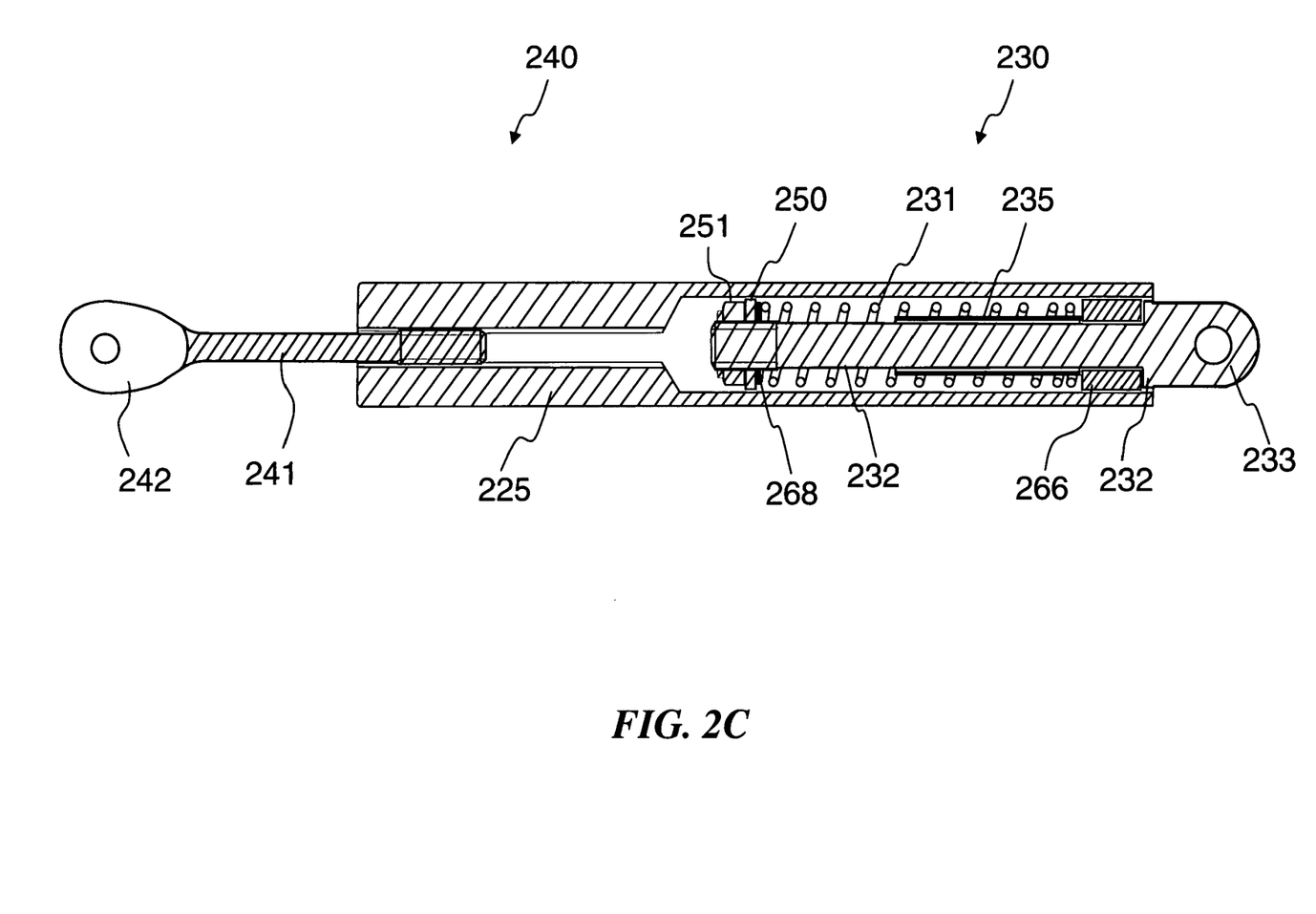
FIG. 2C shows schematically a sectional view of the device shown in FIG. 2A.

In the embodiment of the device of the present invention shown in FIGS. 2A, 2B, and 2C, safety-related aircraft grade hardware is used for component 232, which is a Pin Eye model AN165-22RL with integrated attachment 233, and for component 241, which is a Threaded Clevis model AN-665-34R with integrated attachment 242. The flat indicator 250 may alternatively be a metal or nylon washer, but having a substantial thickness as to allow its outer radial edge (i.e. the edge proximate to the cylindrical housing inside wall) to be colored or otherwise highlighted to render it clearly visible through the slot 263.

FIG. 2C shows a sectional view of the device according to the preferred embodiment shown in FIGS. 2A and 2B. The position of the threaded adjustment bolt 241 and/or measurement sliding bolt 232 may be forcibly locked by addition of a mechanism such as a nylon-tipped set screw through a threaded opening in the housing wall or end plug in a location that interfaces the tip of the locking mechanism with the threads of the corresponding bolt.

Figure 3A:
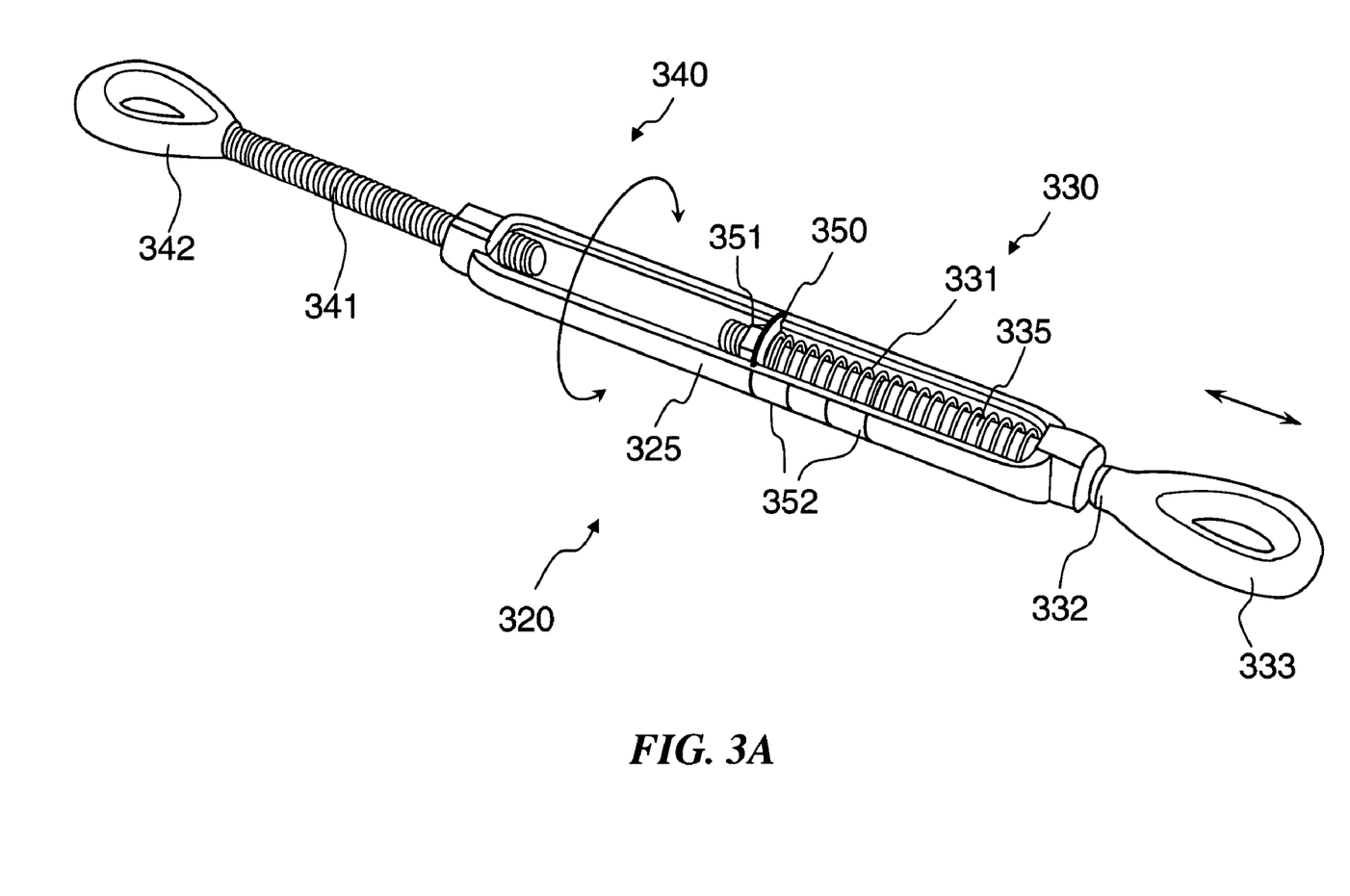
FIG. 3A shows schematically an elevational view of a device according to yet another preferred embodiment of the present invention, without a tension force applied.
Figure 3B:
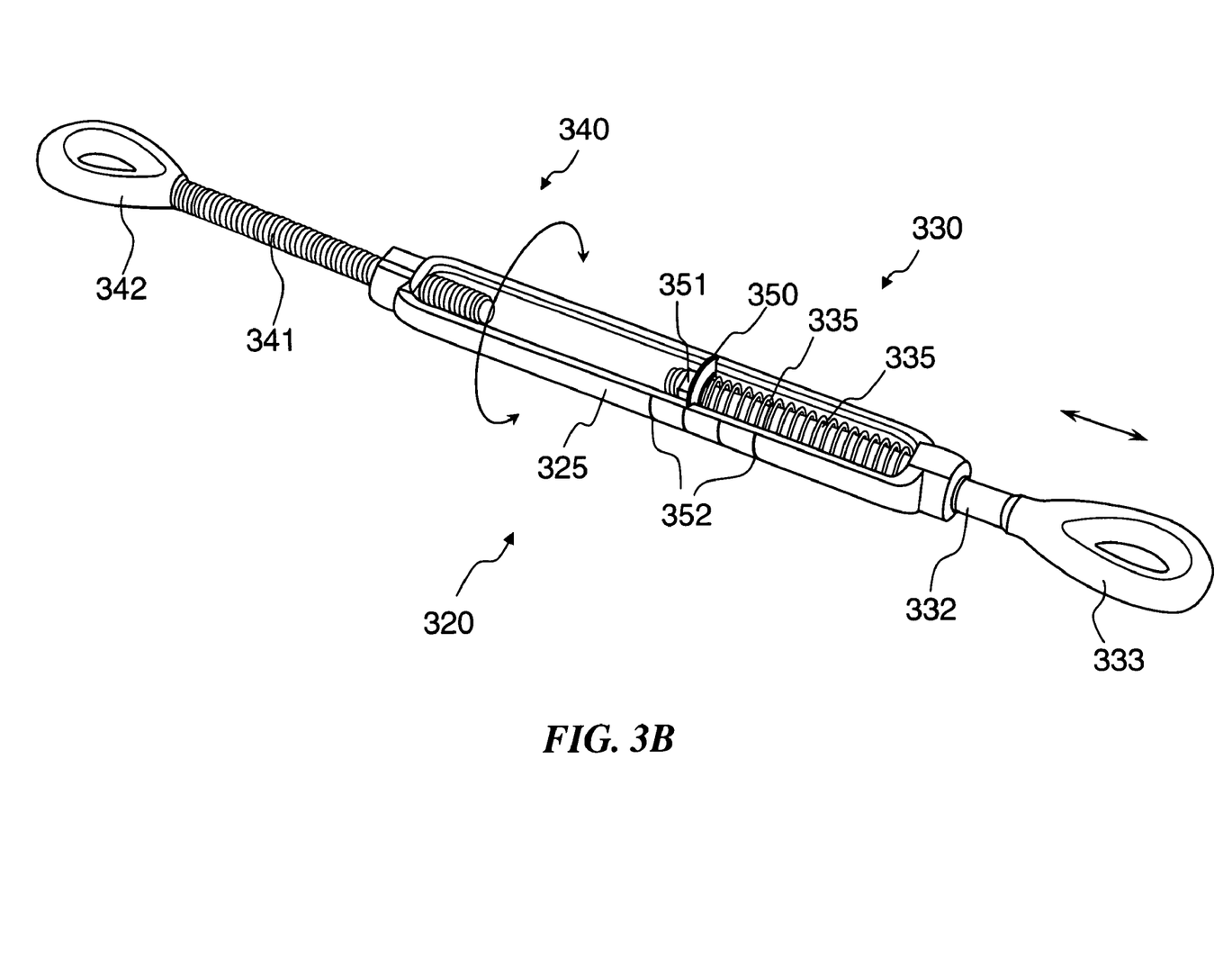
FIG. 3B shows schematically an elevational view of the device shown in FIG. 3A, bearing a tension force.
Figure 3C:
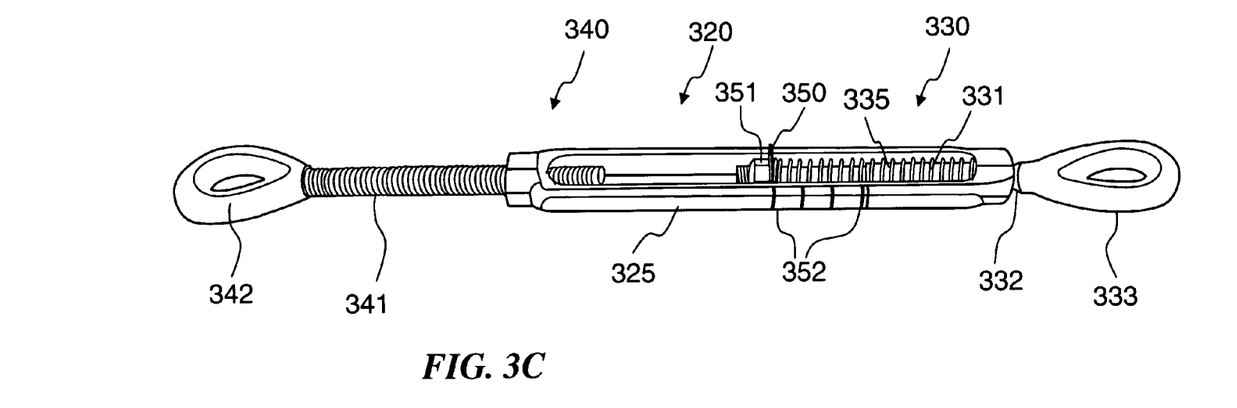
FIG. 3C shows schematically a plan view of the device shown in FIG. 3A.
Figure 3D:
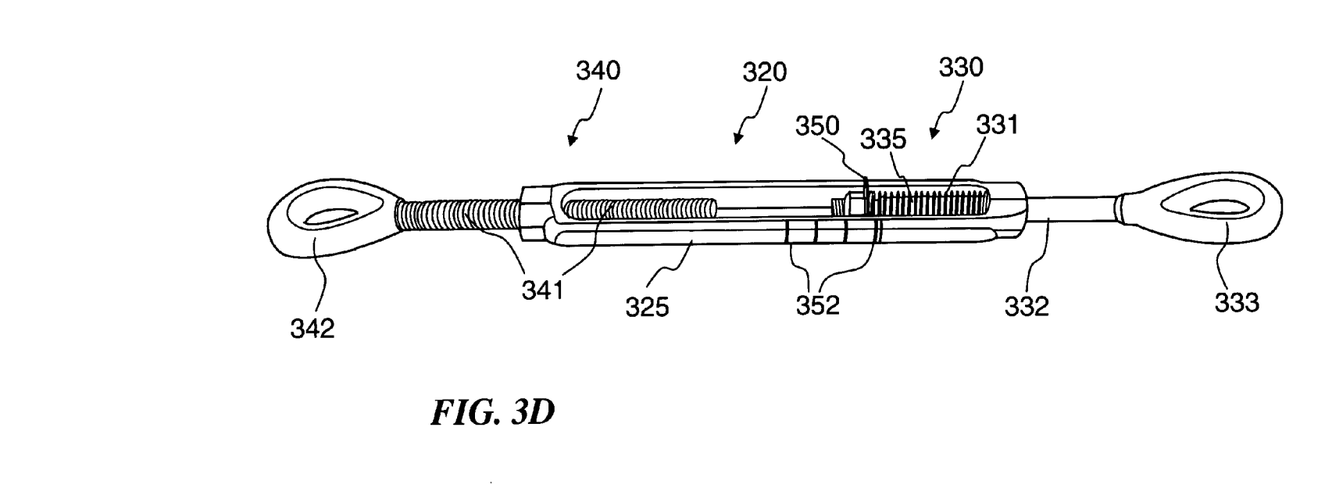
FIG. 3D shows schematically a plan view of the device shown in FIG. 3B.

FIGS. 3A, 3B, 3C, and 3D schematically show a device according to yet another preferred embodiment of the present invention. As shown, frame housing 325 is an open turnbuckle frame which supports the resilient means 331, flat indicator 350, safety sleeve 335, and indicator retainer 351. FIG. 3A and FIG. 3C show the device 320 in a typical configuration when no tension force is applied to system 110 (see FIG. 1). FIG. 3B and FIG. 3D show the device 320 in a configuration that represents compression of the resilient means 331 as when the system 110 is under tension load. Measurement end 330 comprises a measurement sliding bolt 332, such as a ¼-20×2" eyebolt from Fastenal Inc. It is shown in FIGS. 3A, 3B, 3C, and 3D as a threaded sliding eyebolt which can freely spin and extend inside the open inside part of frame housing 325. The measurement portion 330 also comprises an attachment end 333 that is integral with measurement sliding bolt 332 and is configured for interlocking attachment to a corresponding one of the first or second force bearing members 112 or 114, respectively, in a system 110 (see, e.g., FIG. 1). Although shown in FIGS. 3A-3D as an eye-type shape as part of an eyebolt, the attachment end may alternatively take the form of a hook, loop, shackle, sleeve, threaded rod, bolt, or other means. Frame housing 325 is preferably constructed using various steel or aluminum alloys, forged or fabricated using common manufacturing practices and dimensioned according to the scale and forces anticipated by the application to which it will be applied. For indicating an amount of the force present in the system (see, e.g., 110, FIG. 1), pointer 350 is provided, which may also be referred to as a "flat indicator." Pointer 350 moves according to the tension in the system 110 as applied at the measurement sliding bolt 332. The pointer 350 is disposed between indicator retainer 351 and resilient means 331 of the measurement section 330 and is shaped to retain centering of the measurement sliding bolt 332 and resilient means 331 in the hollow inside part of frame housing 325. The pointer 350 is directly interfaced to the measurement sliding bolt 332 and changes its physical position in relation to the frame housing 325 when a force is applied to the device 320 in the system 110. This change in position is proportional to the movement of the measurement sliding bolt 332 being pulled in a direction away from the center of frame housing 325, in response to the tension force in the system 110 as applied to the device 320 via the corresponding force bearing member (see, e.g., 112, 114 in FIG. 1).

Resilient means 331, which as shown is a compression spring such as a catalog number 2852 spring available from Century Spring Inc., is operatively interfaced and dynamically engaged with measurement sliding bolt inside the frame housing 325. An advantage of using a compression spring rather than a spring in tension for the resilient means is that a compression spring can be retained within its optimal manufacturer-designed range of expansion and compression as to maintain an accurate spring constant and thereby offer consistent performance in the device of the present invention, without suffering from the loss in accuracy over its lifetime that occurs with conventional springs under tension. As shown, the pointer 350 is also engaged with the resilient means 331, as the pointer 350 and indicator retainer 351 are attached at the end of the measurement sliding bolt 332 inside the frame housing 325. Proportionally spaced markings 352, of tension units from within a desired range of tension, are marked linearly along the body of the frame housing 325. The pointer 350 therefore moves along the scale to provide a measurement indication of the amount of force in the system 110. The indicator retainer 351 is a lock nut, wherein the threaded end of the measurement sliding bolt 332 is inserted through the flat indicator 350 or the head of a screw or bolt when the preferred configuration of the attachment to the first force bearing member 114 requires the extension of a male thread external to the measurement end. The position of the measurement bolt 332 may be forcibly locked by addition of a mechanism such as a set screw through a threaded opening in the housing wall or end plug in a location that interfaces the tip of the locking mechanism with the threads of the measurement sliding bolt 341. Alternatively, this could be a clamping device that, when actuated, restrains the threads from rotating by application of radial force upon the threads.

Figure 4A:
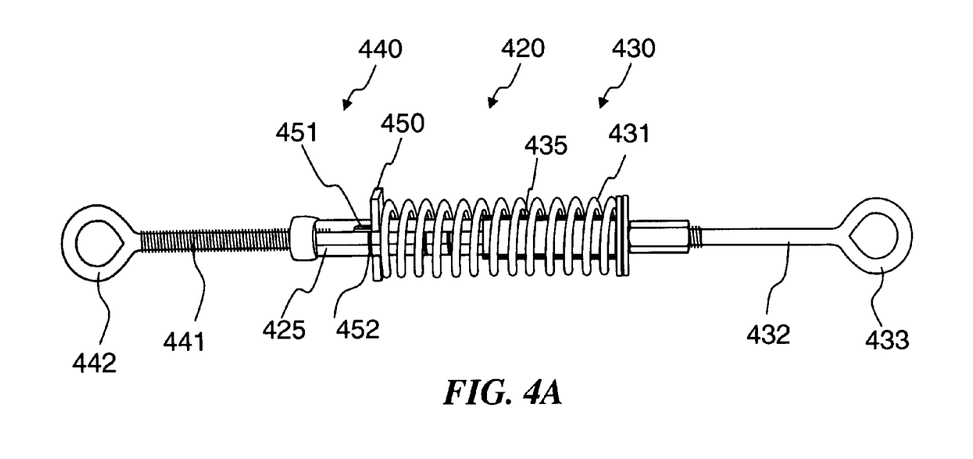
FIG. 4A shows schematically a plan view of a device according to yet another preferred embodiment of the present invention, without a tension force applied.
Figure 4B:
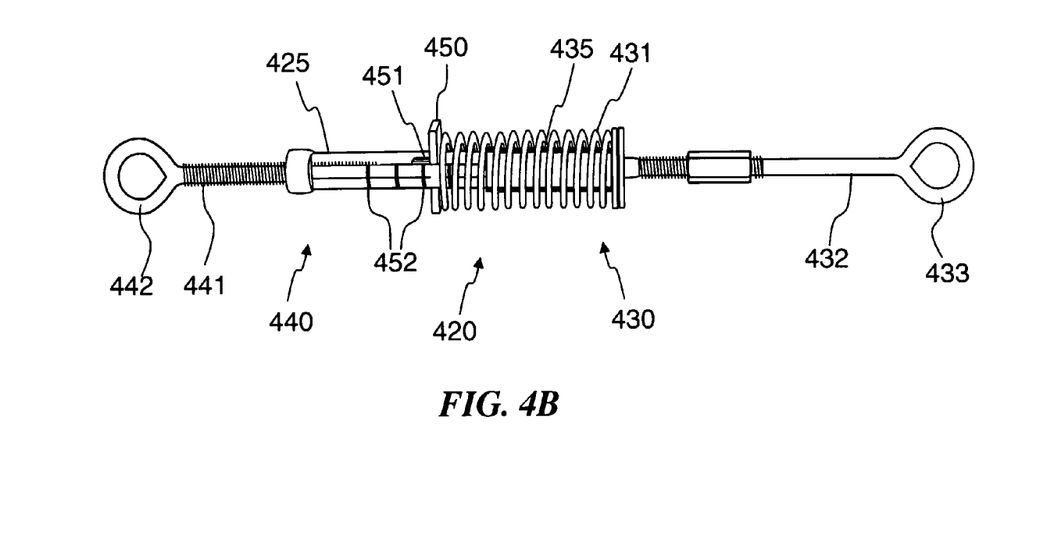
FIG. 4B shows schematically a plan view of the device of FIG. 4A, bearing a tension force.

FIGS. 4A and 4B schematically show a device according to yet another preferred embodiment of the present invention. As shown, resilient means 431 is fitted coaxially over the outside dimension of housing 425. FIG. 4A shows the device 420 in a situation where no tension force is applied to system 110. FIG. 4B shows the device 420 in a situation that represents compression of the resilient means 431, as occurs when the system (see, e.g. 110, FIG. 1) is under tension load.

Figure 5A:
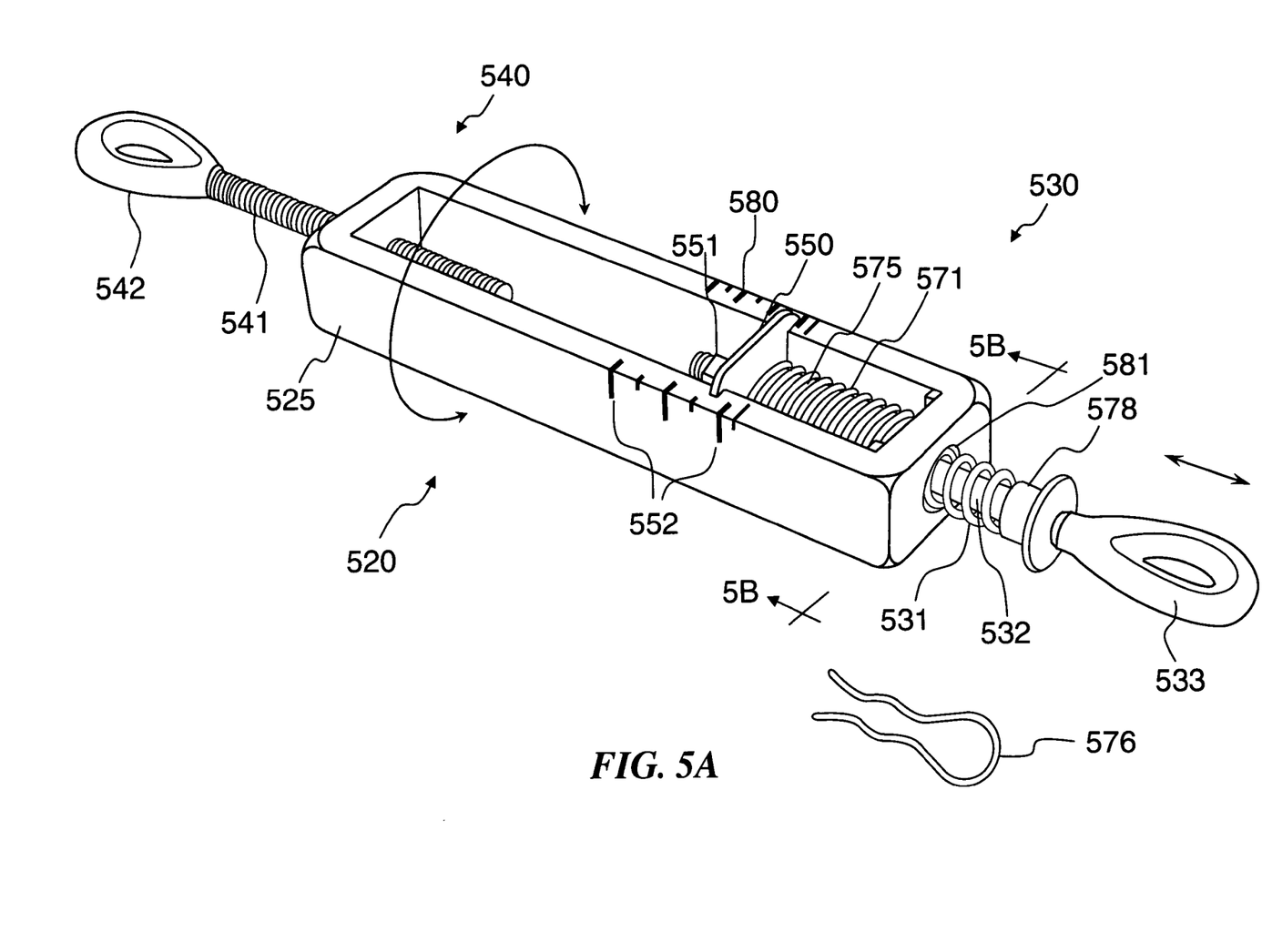
FIG. 5A shows schematically an elevational view of a device according to yet another preferred embodiment of the present invention, without a tension force applied.
Figure 5B:
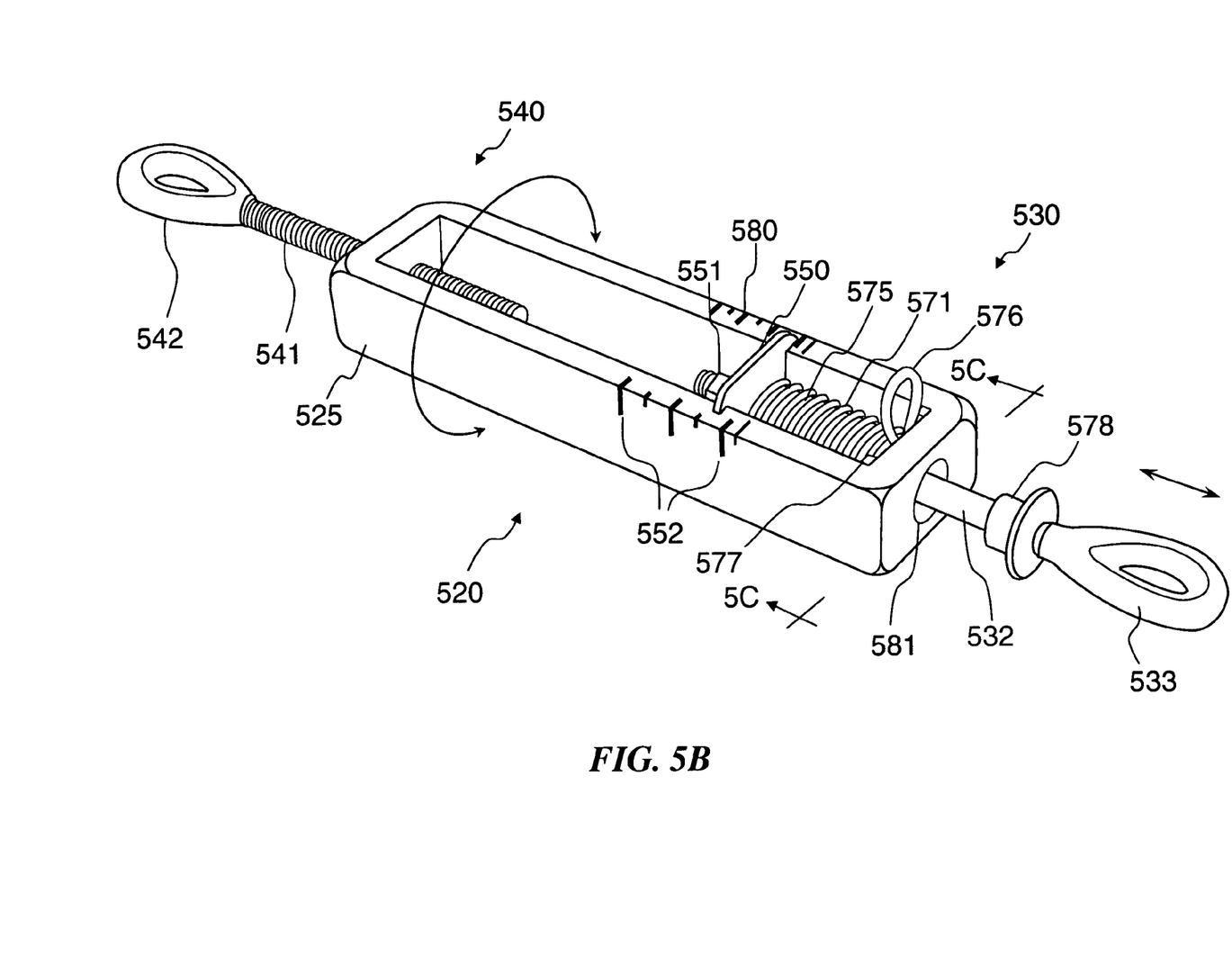
FIG. 5B shows schematically an elevational view of the device shown in FIG. 5A, bearing a tension force.
Figure 5C:
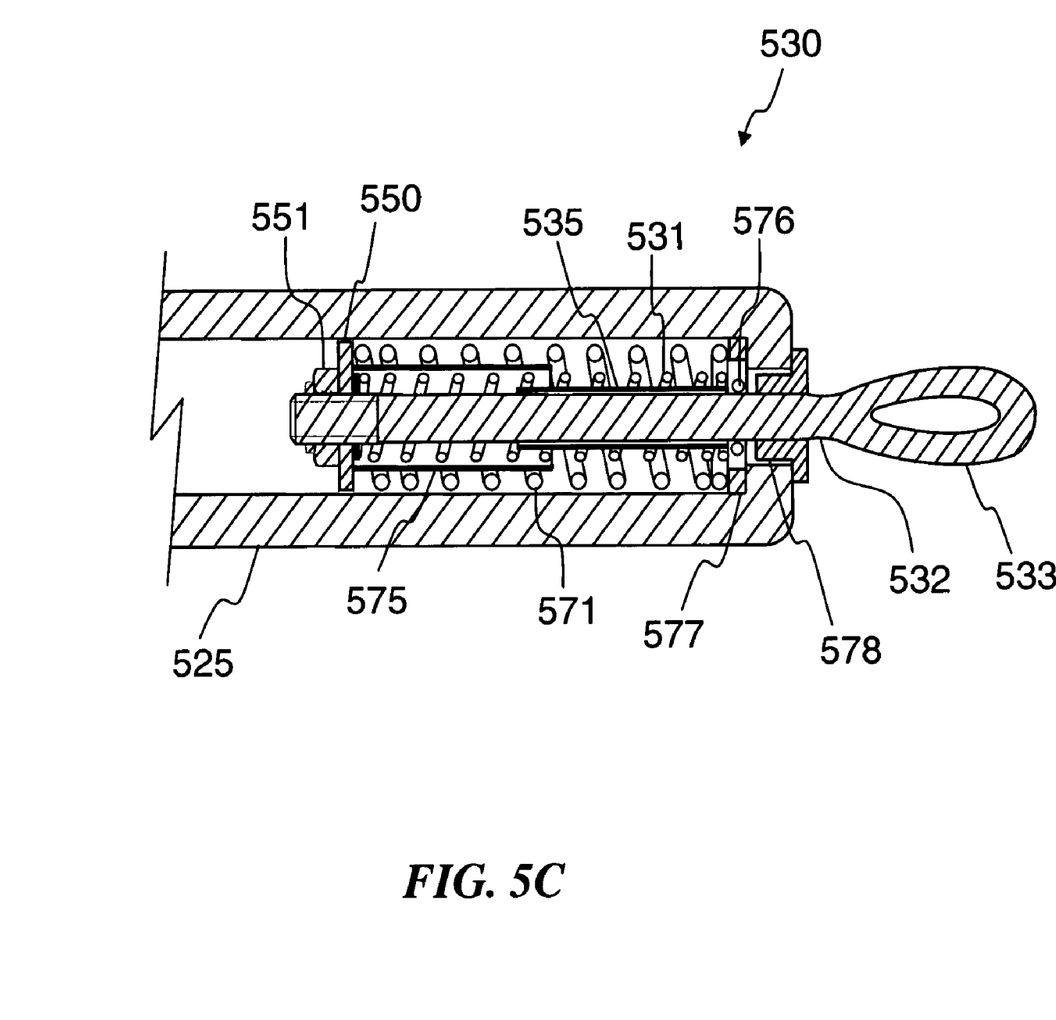
FIG. 5C shows schematically a sectional view of the measurement end of the device shown in FIG. 5A.

FIGS. 5A and 5B show schematically a device according to yet another embodiment of the present invention, where FIG. 5C shows a cutaway view of the measurement end 530 of the of device 520 and describes the coaxial alignment of the components of the dual-range configuration. An additional resilient means 571 is disposed at the measurement end 530 of device 520, to be concentric with the first resilient means 531 and separated radially from the first resilient means 531 by sleeve 576, which permits free and independent motion of the coils of the individual resilient means 531 and 571, to allow operation of device 520 in two modes designated as low-range mode and high-range mode. For the measurement end 530 to function in the high-range mode, a mode selection device 576, which can be a spring clip generally shaped as a hairpin as demonstrated in FIG. 5B or other shape that accommodates the selection and retention function, is inserted to clip over measurement eyebolt 532. The mode selection device is designed to function in interface with the internal end of housing 525 to retain resilient means 531 within the housing 525, thereby engaging both resilient means 531 and 571 to provide resistance force. When both first resilient means 531 and second resilient means 571 are retained within housing 525 while eyebolt 532 is in tension in the system (see, e.g. FIG. 1, 110), the cumulative value of the springs' resistance force provided is indicated by a second set of indication marks 580 which have been placed on the outer surface of housing 525 to provide the tension reading for high-range mode operation as indicated by the position of indicator washer 550. Indicator washer 550 also provides radial centering of the eyebolt 532 and other moving components of measurement end 530, operating in conjunction with alignment sleeve 578, which maintains coaxially centered alignment of the eyebolt 532 when near-zero tension is applied by system 110, as in the instance of initial tightening of the tension in system 110.

A low-range mode of operation of the measurement end 530 is enabled by removal of the mode selection device 576, which allows first resilient means 531 to freely move longitudinally through the end hole 581 in the measurement end of housing 525. In this configuration, only the resilient means 571 is enabled as interfaced on each end by the indicator washer 550 and spacers 577. The value of the spring 571 resistance force provided is indicated by a first set of indication marks 552 which have been placed on the outer surface of housing 525 to provide the system tension reading for low-range mode operation as indicated by the position of indicator washer 550. The mode may be selected when the system 110 has no significant tension applied. In either the low-range or high-range mode, adjustment of the tension in system 110 may be made by rotatably restraining the adjustment eyebolt 541 and rotating the housing 525, or by rotatably restraining housing 525 while rotating adjustment eyebolt 541. In either mode, safety sleeve 535 provides radial centering of the components of measurement end 530 and provides a hard stop to prevent over-compression of either or both of the resilient means 531 and 571.

One or more of the above-described embodiments of the present invention discloses a device and method of use for adjusting cable tension while simultaneously obtaining an accurate measurement value such that the tension level can be adjusted and set according to the measurement value until it reaches a desired value, with the additional function of allowing temporary and dynamic loads to be applied to the cables with less detrimental effects on the other components of the cable system. Moreover, one or more embodiments can provide for allowing a cable system to absorb temporary, dynamic loads, thereby reducing strain effects on other system components. Further, a default to a fail-to-safe condition in the case of failure of any component of the device can be allowed. Still further it can restrain and prevent loosening of the cable tension due to relaxation of the device settings during use, particularly in an environment having variable external influences on the system such as additional variable dynamic loads or high vibration. It can offer a range of available motion in the components of the device as to allow the cable system to achieve a reduction in the effects of sudden, temporary, or dynamic loads upon the system, without reducing the safety of operation and returning the system to the nominal position as calibrated by adjustment. Also, a system strength equal to or exceeding that of the pull strength of the next-weakest component in the system (i.e. such that the device cannot be the weakest link in the system) can be used. It can further provide an indication when a component in the cable system has failed, slipped, or otherwise reduced the desired system tension. The device and method can be repeatable, simple, and intuitive to operate. The device can be light in weight and have a compact form factor in applications where physical size and weight are considerations, and an easily scaleable design for desired applications ranging from low tension, small scale operations to high tension, large scale operations. The design can be corrosion resistant, manufacturable using standard fabrication and assembly processes.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A device for setting, adjusting, and measuring tension in a system, comprising:
    a frame housing having a set of scale markings fixed thereon for indicating tension, an adjustment end, and a measurement end at an opposite end of said frame housing from said adjustment end;
    a sliding measurement member operative to slip in the longitudinal and rotational axes through an opening in said measurement end of said frame housing, comprising an attachment portion extending outside of said frame housing and a shaft portion disposed partially inside said frame housing;
    a threaded adjustment member at said adjustment end, operative to adjust said tension in said system, comprising adjustment threads on one end and disposed inside said frame housing and an adjustment member attaching means on another end extending outside of said frame housing, and wherein said threaded adjustment member is rotatable in interface with threads formed in an opening of said adjustment end of said frame housing for changing a distance between said adjustment end and said measurement end in response to rotational turns applied at least one of said threaded adjustment member and said frame housing, such that the tension in the system is changed in proportion to the change in distance;
    a locking insert member disposed at an end of said shaft portion of said sliding measurement member;
    a resilient member retained inside said frame housing, having one end nearest to said attachment portion of said sliding measurement member and another end at the opposite end of said sliding measurement member at said locking insert member; and
    an indicator positioned within said frame housing at the end of the resilient member at said locking insert member, configured to retain said end of said resilient member and to visually mark said tension in said system.

2. The device of claim 1, wherein said sliding measurement member is operatively attached to a first force-bearing member in said system, and wherein said adjustment member is operatively attached to a second force-bearing member in said system.

3. The device of claim 1, wherein said sliding measurement member and said threaded adjustment member each comprise corresponding attachment ends, each of said attachment ends comprising at least one of a hook, loop, shackle, sleeve, clevis, and rod end bearing, and wherein each of said attachment ends is configured to be detachably coupled to a corresponding one of said first force-bearing member and said second force-bearing member.

4. The device of claim 2, wherein at least one of said first force-bearing member and said second force-bearing member comprises a cable.

5. The device of claim 1 wherein said resilient member comprises at least one compression spring.

6. A device for setting, adjusting, and measuring tension in a cable system having one or more cables, comprising:
    a frame housing having a set of scale markings market thereon for indicating a level of tension in said cable system, an adjustment end, and a measurement end at an opposite end of said frame housing from said adjustment end;
    a sliding measurement member configured to slip in the longitudinal and rotational axes through an opening in said measurement end of said frame housing, comprising an attachment portion extending outside of said frame housing, and a shaft portion disposed partially inside said frame housing;
    a threaded adjustment member at said adjustment end, configured to operatively adjust said tension in said cable system, comprising adjustment threads on one end and disposed inside said frame housing and an adjustment member attachment portion on another end extending outside of said frame housing, and wherein said threaded adjustment member is rotatable in interface with threads formed in an opening of said adjustment end of said frame housing such as to change a distance between said adjustment end and said measurement end in response to rotational turning force applied to at least one of said threaded adjustment member and said frame housing, such that the tension in the cable system is changed in proportion to the change in distance;
    a locking insert member disposed at an end of said shaft portion of said sliding measurement member;
    a compression spring retained inside said frame housing, having one end nearest to said attachment portion of said sliding measurement member and another end at the opposite end of said sliding measurement member at said locking insert member, configured to generate a spring force for measurement of said tension in said cable system;

a flat indicator positioned within said frame housing at the end of said compression spring at said locking insert member, configured to retain said end of said compression spring, and for visually marking the tension in said cable system.

7. The device of claim 6, wherein each of said sliding measurement member and said adjustment member comprise one or more attachment portions on one or more respective ends configured to couple a cable thereto.

8. The device of claim 7, wherein said compression spring comprises an inner compression spring having a first diameter and an outer compression spring having a second diameter greater than the diameter of said inner compression spring, such that said outer compression spring surrounds said inner compression spring.

9. The device of claim 8, further comprising a cylindrical separation sleeve over the outside diameter of said inner compression spring and under the inside diameter of said outer compression spring, configured to slidably separate said inner compression spring and said outer compression spring.

10. The device of claim 9, wherein said inner compression spring and said outer compression spring have corresponding predetermined spring constants such that a greater spring force is generated when both springs are configured to generate the spring force than when only one spring is configured to generate the spring force, and wherein the predetermined spring constant of said inner compression spring is the same as or different from the predetermined spring constant of said outer compression spring.

11. The device of claim 10, further comprising a mode lock member configured to selectively engage engaging one or both of said inner compression spring and said outer compression spring such as to provide a spring force, and wherein said mode lock member comprises at least one of a step washer, locking pin, and spring clip.

12. The device of claim 6, further comprising a safety wire bore through said frame housing, configured to anchor a backup safety wire operable for preventing unintended rotation of said threaded adjustment member.

13. The device of claim 7, wherein each of said one or more attachment portions comprise at least one of a closed eyebolt, shackle, hook, open eyebolt, loop, and threaded rod.

14. A device for setting, adjusting, and measuring tension in a system, comprising:

a frame housing having a set of scale markings for indicating tension, an adjustment end, and a measurement end at an opposite end of said frame housing from said adjustment end;

a sliding measurement member operable for slipping in the longitudinal and rotational axes through an opening in said measurement end of said frame housing, comprising an attachment portion extending outside of said frame housing and a shaft portion disposed partially inside said frame housing;

a threaded adjustment member at said adjustment end, for adjusting said tension in said system, comprising adjustment threads on one end and disposed inside said frame housing and an adjustment member attaching means on another end extending outside of said frame housing, and wherein said threaded adjustment member is rotatable in interface with threads formed in an opening of said adjustment end of said frame housing such as to change a distance between said threaded adjustment end and said measurement end in proportion to an amount of rotational turns applied to at least one of said adjustment member and said frame housing, such that the tension in the system is changed in proportion to the change in distance;

a resilient member retained inside said frame housing, having one end nearest to said attachment portion of said sliding measurement member and another end at the opposite end of said sliding measurement; and a flat indicator positioned within said frame housing at the end of the resilient member, operable for retaining said end of said resilient member and for visually marking the tension in the system.

15. The device of claim 14, wherein said sliding measurement member is operatively attached to a first force-bearing member in said system, and wherein said threaded adjustment member is operatively attached to a second force-bearing member in said system.

16. The device of claim 15 wherein said sliding measurement member and said threaded adjustment member each comprise corresponding attachment ends configured for interlocking attachment to a corresponding one of said first force-bearing member and said second force-bearing member.

17. The device of claim 16, wherein each of said attachment ends comprise at least one of a hook, loop, shackle, sleeve, clevis, and rod end bearing.

* * * * *